United States Patent [19]
Yamarik et al.

[11] 3,918,835
[45] Nov. 11, 1975

[54] CENTRIFUGAL COOLING AIR FILTER

[75] Inventors: George J. Yamarik, Vernon; Harold M. Craig, West Hartford, both of Conn.

[73] Assignee: United Technologies Corporation, Hartford, Conn.

[22] Filed: Dec. 19, 1974

[21] Appl. No.: 534,312

[52] U.S. Cl. .................................. 416/95; 416/97
[51] Int. Cl.² ........................................ F01D 5/08
[58] Field of Search ........ 415/115, 116; 416/95, 96, 416/97

[56] References Cited
UNITED STATES PATENTS

| | | |
|---|---|---|
| 2,632,626 | 3/1953 | McClintock ..................... 415/116 |
| 2,648,520 | 8/1953 | Schmitt .......................... 415/115 |
| 2,763,427 | 9/1956 | Lindsey .......................... 415/115 |
| 3,356,340 | 12/1967 | Bobo .............................. 415/116 |
| 3,362,681 | 1/1968 | Smuland ......................... 415/115 |
| 3,370,830 | 2/1968 | Nickles et al. .................. 416/95 |
| 3,749,514 | 7/1973 | Keich et al. .................... 416/95 |
| 3,791,758 | 2/1974 | Jenkinson ....................... 415/116 |

Primary Examiner—Henry F. Raduazo
Attorney, Agent, or Firm—Charles A. Warren

[57] ABSTRACT

Contamination of cooling air to the turbine blades of a gas turbine is prevented by a centrifugal filter at the inlet ends of the coolant passages in the rotor.

7 Claims, 3 Drawing Figures

CENTRIFUGAL COOLING AIR FILTER

SUMMARY OF THE INVENTION

Blade cooling air for turbine blades of a gas turbine engine is obtained generally from the compressor and this air is usually contaminated with foreign particles such as dust and dirt or other contaminants entering the engine. If such contaminants enter the cooling passages of the blade they may block the cooling cavities and possibly cause blade failure. Conventional filters in the blade cooling air are not desirable since they cause pressure losses and require periodic maintenance.

One feature of this invention is the separation of the foreign particles by a centrifuging action created by the geometry of the rotor at the air inlet thereto.

According to the present invention, the rotor is constructed with a raised lip at the inlet to the passages in the rotor through which the cooling air reaches the passages in the blades. This lip is so arranged that the particles which are carried along the rotor surface by centrifugal action do not enter the rotor passage. The lips extend at least to some extent in a radially inward direction and the particles will not move radially inwardly in the existing centrifugal field.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENT

Figure 1:
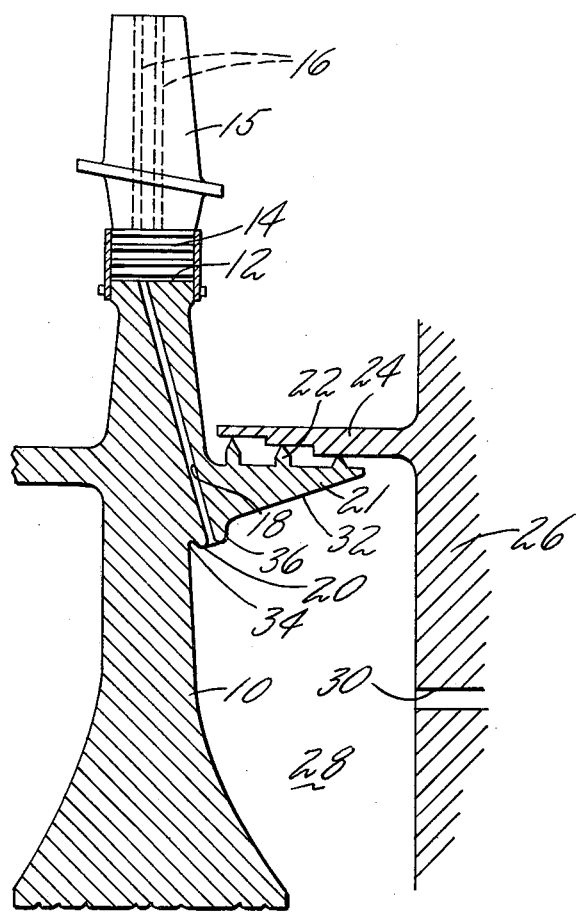
FIG. 1 is a longitudinal sectional view through one disk of a turbine rotor.

Referring to the drawing, the rotor is generally made up of a plurality of disks only one of which is shown. This disk 10 has a plurality of slots 12 in its outer periphery to receive the roots 14 of a row of blades 15 extending radially out from the disk. These blades are cooled in high performance turbine engines by a flow of cooling air through these blades in one manner or another. In the example shown the blade, shown in section has a plurality of radial passages 16 therein extending outwardly from the base of the root. Other more complex blade cooling structures may and usually are used. To supply air to these passages the rotor has radial passages 18 therein extending from one side of the rotor to the individual slots at the base thereof. To accomplish this the passages 18 are at an oblique angle to the plane of the disk as shown.

At the side of the disk radially outward from the inlet ends 20 of the passages 18 there is an axially projecting flange or rib 21 which may carry sealing elements 22 on its outer surface cooperating with a fixed flange 24 on the stationary structure 26 of the turbine. The structure 26 cooperates with the rotor to define a chamber 28 into which cooling air under pressure, as from the compressor, is directed through an inlet 30. This inlet may carry a nozzle, not shown, to impart a tangential motion to the air entering the chamber.

At the area of the disk surrounding the inlet ends 20 of the air passages the surface of the rotor diverges from the centerline of the engine to form a surface surrounding each passage that is facing at least to some extent toward the axis. Thus the inlets 20 face toward the engine axis. In the arrangement shown, this surface is a result of a somewhat conical inner surface 32 on the rib 21 that blends at a relative large radius 34 with the side surface of the rotor.

Figure 2:
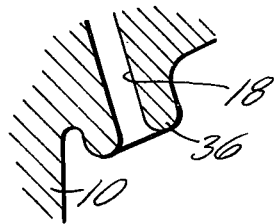
FIG. 2 is an enlargement of the inlet end of the air passage.
Figure 3:
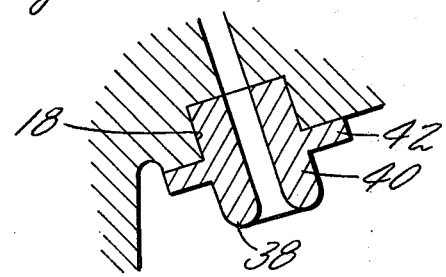
FIG. 3 is a view similar to FIG. 2 of a modification.

A lip 36 is formed at the inlet end 20 of each passage and is also directed to a substantial extent in a radially inward direction as shown. In FIGS. 1 and 2 this lip 36 is integral with the rotor. In FIG. 3 the lip 38 is formed on a sleeve 40 that fits in part into the end of passage 18. This sleeve may have a flange 42 to position it in the inlet. The inlet may be bellmouthed by shaping the lip to minimize pressure loss.

In either arrangement, the foreign particles in the air in chamber 28 are thrown out centrifugally by the circulation of this air against the surfaces 34 and 32 and move along surface 34 toward the outer end of the surface. The particles near the inlets 20, without the lip, would be drawn in with the air into the passages and possibly become lodged in the blade with resultant inadequate cooling. With the raised lip, the particles adjacent the inlet do not reach it since they would have to move to a smaller radius in a centrifugal field. Thus they move around the lips rather than over them and continue along the surface 32 to the outer edge. Here they pass around the rib and carried by leakage air past the seal into the gas stream through the turbine. Thus there is no periodic maintenance required for accumulation of impurities.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention that which we claim as new and desire to secure by Letters Patent of the United States is:

1. A rotor construction including:
   a blade supporting disk having a rib on one side thereof concentric to the disk,
   a plurality of blades on the periphery of the disk said blades having cooling passages therein,
   a plurality of passages in said rotor extending radially outwardly from a point radially inwardly of the rib to the periphery of the disk to supply coolant to the passages in the blades,
   said disk having projecting lips at the inlet end of each disk passage to minimize the entrance of foreign matter to the disk passages.

2. A rotor construction as in claim 1 in which the rib extends substantially axially and the inlet to the disk passages is located adjacent to the junction between the rib and the disk surface.

3. A rotor construction as in claim 1 in which the rib and disk are joined by a surface extending at an acute angle to the axis of the disk and the inlets to the passage are in this surface.

4. A rotor construction including:
   a blade supporting disk having a plurality of slots in the periphery,
   a row of blades mounted on and extending outwardly from the disks, said blades having roots positioned in said slots, said disk having an axially extending rib on one side of said disk at a point radially inward of the slots, a plurality of passages in said disk extending from inlets on the side of the disk carrying the rib to the slots on the periphery, said inlets being at a point radially inward of the rib, and a projecting rim on the inlet end of each passage, said rim extending outwardly from the surface of the disk.

5. A rotor construction as in claim 4 in which the disk has a blending surface between the disk and rib that extends at an acute angle to the axis of the disk, and the passage inlets and rims are in this surface.

6. A rotor construction as in claim 5 in which the projecting rims are integral with the disks.

7. A rotor construction as in claim 4 in which the projecting rims are on the ends of annular inserts positioned in the inlets to the passages.

* * * * *